United States Patent
Huang et al.

(10) Patent No.: US 12,411,577 B2
(45) Date of Patent: Sep. 9, 2025

(54) DRIVER INTEGRATED CIRCUIT FOR TOUCH SENSING AND DRIVING METHOD THEREOF

(71) Applicant: Novatek Microelectronics Corp., Hsinchu (TW)

(72) Inventors: Guan-Shiung Huang, Hsinchu County (TW); Hsin-Ting Chan, Taichung (TW); Ding-Teng Shih, Taoyuan (TW); Ming-Han Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/666,834

(22) Filed: May 17, 2024

(65) Prior Publication Data
US 2025/0264957 A1    Aug. 21, 2025

(30) Foreign Application Priority Data
Feb. 19, 2024 (TW) ................................ 113105683

(51) Int. Cl.
*G06F 3/041* (2006.01)

(52) U.S. Cl.
CPC .............................. *G06F 3/041661* (2019.05)

(58) Field of Classification Search
CPC .................................................. G06F 3/041661
See application file for complete search history.

(56) References Cited

U.S. PATENT DOCUMENTS

| 10,429,993 B2 | 10/2019 | Lin et al. |
| 2016/0154507 A1* | 6/2016 | Bharathan .............. G06F 3/0418 345/174 |
| 2018/0275827 A1* | 9/2018 | Lin ....................... G06F 3/0412 |
| 2021/0397341 A1 | 12/2021 | Ye |

FOREIGN PATENT DOCUMENTS

| CN | 112241225 | 1/2021 |
| TW | 201712517 | 4/2017 |

OTHER PUBLICATIONS

"Office Action of Taiwan Counterpart Application", issued on Sep. 23, 2024, p. 1-p. 7.
Computer King Team, "What are the "screen refresh rate" and "touch sampling rate" that are often emphasized in mobile phones recently?", Aug. 15, 2021, with English translation thereof, Available at: https://www.koc.com.tw/archives/398427.
"Office Action of Taiwan Counterpart Application", issued on Jul. 2, 2025, p. 1-p. 5.

* cited by examiner

Primary Examiner — Robert J Michaud
(74) Attorney, Agent, or Firm — JCIPRNET

(57) ABSTRACT

A driver integrated circuit for touch sensing and a driving method thereof are provided. The driver integrated circuit includes a touch sensing control circuit. The driver integrated circuit is adapted for driving a touch panel with a touch sensor. The touch sensing control circuit is configured to drive the touch panel to execute a first detection operation. The touch sensing control circuit drives the touch panel to execute a scanning operation after receiving a touch signal. After executing the scanning operation, the touch sensing control circuit drives the touch panel to execute a second detection operation. A sampling frequency of the second detection operation is higher than a sampling frequency of the first detection operation.

20 Claims, 7 Drawing Sheets

DRIVER INTEGRATED CIRCUIT FOR TOUCH SENSING AND DRIVING METHOD THEREOF

CROSS-REFERENCE TO RELATED APPLICATION

This application claims the priority benefit of Taiwan application serial no. 113105683, filed on Feb. 19, 2024. The entirety of the above-mentioned patent application is hereby incorporated by reference herein and made a part of this specification.

BACKGROUND

Technical Field

The disclosure relates to a driving circuit, and in particular relates to a driver integrated circuit for touch sensing and a driving method thereof.

Description of Related Art

For a universal terminal device with touch sensing, the universal terminal device may include a touch sensing control chip, and the chip independently communicates with the central processing unit of the terminal device. Therefore, when the terminal device executes a touch recognition operation for operations such as a game operation or a continuous program operation, the chip controls the touch panel to perform touch detection and touch scanning at a fixed sampling frequency, for example, performing touch detection at a frequency of 240 Hz.

SUMMARY

The disclosure relates to a driver integrated circuit for touch sensing and a driving method thereof, which may quickly execute a corresponding touch detection mode according to a touch event to reduce the delay time of touch detection.

The driver integrated circuit of the disclosure is adapted for driving a touch panel with a touch sensor. The driver integrated circuit includes a touch sensing control circuit. The touch sensing control circuit is configured to drive the touch panel to execute a touch operation. The touch sensing control circuit is configured to drive the touch panel to execute the first detection operation. In response to receiving a touch signal, the touch sensing control circuit drives the touch panel to execute a scanning operation. After executing the scanning operation, the touch sensing control circuit drives the touch panel to execute a second detection operation. A sampling frequency of the second detection operation is higher than a sampling frequency of the first detection operation.

The driving method of the disclosure is adapted for a driver integrated circuit for touch sensing. The driver integrated circuit is adapted for driving a touch panel with a touch sensor, and the driver integrated circuit includes a touch sensing control circuit. The driver integrated circuit includes the following operation: driving the touch panel through the touch sensing control circuit to execute a first detection operation. Receiving a touch signal through the touch sensing control circuit, and driving the touch panel to execute a scanning operation through the touch sensing control circuit. Driving the touch panel through the touch sensing control circuit to execute a second detection operation after executing the scanning operation. A sampling frequency of the second detection operation is higher than a sampling frequency of the first detection operation.

Based on the above, according to the driver integrated circuit and driving method of the disclosure, the driver integrated circuit may drive the touch panel through multiple operating modes, thereby effectively reducing the delay of touch detection and through high-frequency sampling. Touch events are detected so that the driver integrated circuit 100 may drive the touch panel to sensitively detect the user's touch events.

In order to better understand the foregoing content, several embodiments with accompanying drawings are described in detail as follows.

DETAILED DESCRIPTION OF DISCLOSED EMBODIMENTS

It is to be understood that other embodiments may be utilized and structural changes may be made without departing from the scope of the disclosure. Furthermore, it is to be understood that the wording and terminology used herein are for the purpose of description and should not be regarded as limiting. The use of "including," "comprising," or "having" and variations thereof herein is intended to encompass the items listed thereafter and their equivalents as well as additional items. Unless otherwise limited, the terms "connected," "coupled," and "mounted" and variations thereof herein are used broadly and encompass direct and indirect connections, couplings, and installations.

Figure 1:
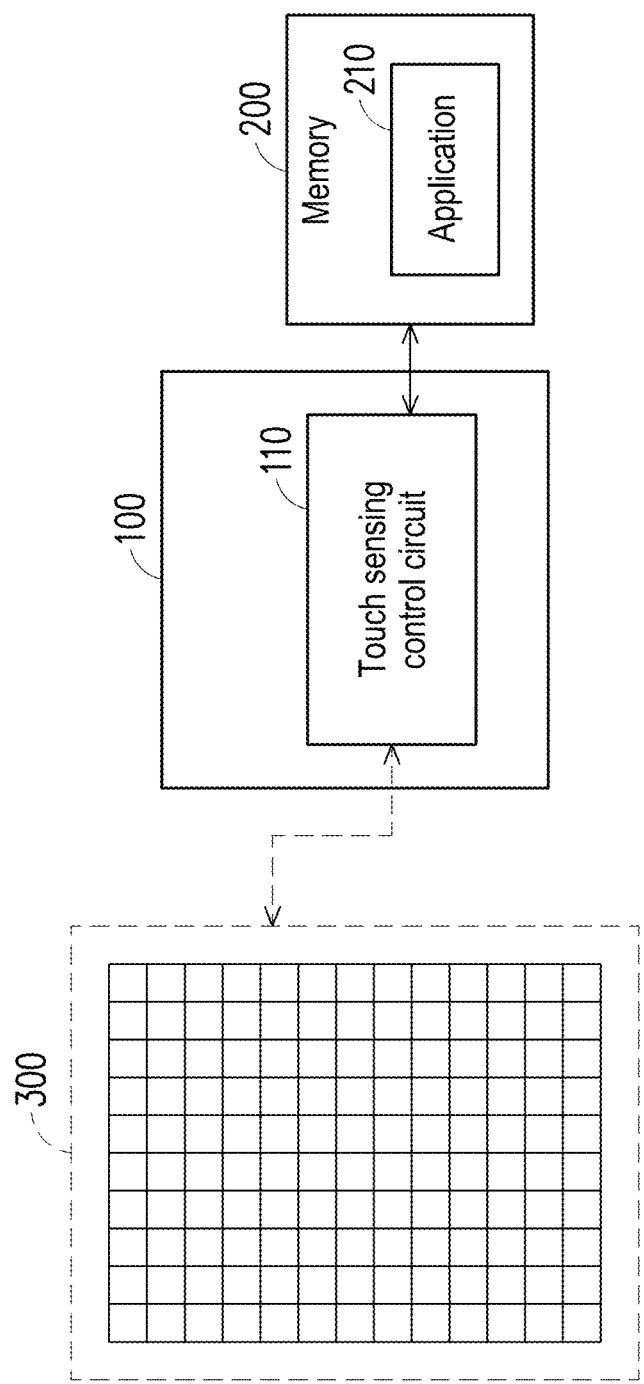
FIG. 1 is a schematic diagram of a driver integrated circuit and a memory of an embodiment of the disclosure.

FIG. 1 is a schematic diagram of a driver integrated circuit and a memory of an embodiment of the disclosure. Referring to FIG. 1, a driver integrated circuit 100 is coupled to a memory 200 and a touch panel 300 with a touch sensor. Furthermore, the driver integrated circuit 100 may be implemented in electronic devices, such as mobile phones, computers, and tablets. In an embodiment of the disclosure, the driver integrated circuit 100 may be a fingerprint, touch and display driver integrated chip (FTDI IC). The driver integrated circuit 100 includes a touch sensing control circuit 110. The memory 200 stores an application 210. In an embodiment of the disclosure, the touch sensing control circuit 110 and the application 210 are configured to have a first direct communication therebetween to facilitate at least one of a touch sensing operation and a display operation. In another embodiment, the driver integrated circuit 100 is a touch display driver chip that may drive and sense touch events on the touch panel 300.

In the disclosure, the touch panel 300 may be a liquid crystal display (LCD) touch panel or an OLED touch panel. The touch sensing circuit of the LCD touch panel is integrated with the display pixel array, while the OLED touch panel may be a separate touch circuit and display panel, or the capacitive or optical touch sensing circuit may be integrated into the OLED display panel.

The touch sensing control circuit 110 may include a read circuit coupled to multiple touch sensing columns (e.g., touch detection electrode columns) of the touch panel 300 via multiple switches. Generally speaking, the read circuit includes an analog front end (AFE) circuit, an analog-to-digital converter (ADC), and/or other circuits. Based on the scanning operation, the read circuit may read the touch detection result of the touch display panel, and output the touch detection data corresponding to the touch detection result to the touch sensing control circuit 110.

The touch sensing control circuit 110 may execute an algorithm to process the touch detection data, and thereby acquire the location of the touch event that occurs on the touch display panel/touch panel 300. The touch sensing control circuit 110 also includes a timing controller and/or other driving circuits. The touch sensing control circuit 110 may control (or drive) the touch display panel to display one or more image frames. Based on the display driving operation of the touch display panel, the touch sensing control circuit 110 may output a touch frame synchronization signal TSVD and a touch column synchronization signal TSHD accordingly. The touch frame synchronization signal TSVD and the touch column synchronization signal TSHD are periodic pulse signals, and each pulse indicates the start time of the touch sensing frame. A period of the touch frame synchronization signal TSVD may include N periods of the touch column synchronization signal TSHD, and in each touch sensing period, one or more columns of touch electrodes (touch sensors) of the touch panel 300 may be detected. N is a positive integer.

In an embodiment of the disclosure, the touch frame synchronization signal TSVD is output once every five times the touch column synchronization signal TSHD is output. The frequency of outputting the touch frame synchronization signal TSVD is 100 Hz to 500 Hz or other frequencies. For example, the frequency of outputting the touch frame synchronization signal TSVD may be 240 Hz.

Under the first detection operation of the disclosure, the touch sensing control circuit 110 may drive the touch panel 300 to perform a one-dimensional touch detection (i.e., execute touch sensing) when receiving each touch frame synchronization signal TSVD, to obtain the touch detection data corresponding to one-dimensional touch detection. The one-dimensional touch detection in this disclosure drives the touch panel 300 to perform touch detection only in the X-axis direction or only in the Y-axis direction, thereby detecting whether there is a touch event. The two-dimensional touch scanning in this disclosure drives the touch panel 300 to scan touch coordinates in the X-axis direction and the Y-axis direction.

Under the second detection operation of the disclosure, the touch sensing control circuit 110 may drive the touch panel 300 to perform a one-dimensional touch detection when receiving each touch column synchronization signal TSHD. Therefore, the touch sensing frequency of the second detection operation is five times the touch sensing frequency of the first detection operation.

In an embodiment of the disclosure, the driver integrated circuit 100 may be coupled to the processing circuit of the application 210 and the touch panel 300. In this embodiment, the processing circuit of the application 210 is coupled to the driver integrated circuit 100 and the memory 200, and the processing circuit of the application 210 may access the memory 200 to execute the application 210 stored in the memory 200. The application 210 may be an operating system or a functional program. In an embodiment of the disclosure, the fingerprint sensing control circuit may be configured to drive the fingerprint sensor to execute a fingerprint sensing operation. A display driving circuit may be configured to drive the touch panel 300 to execute a display operation. The touch sensing control circuit 110 may be configured to drive the touch panel 300 to execute a touch operation.

In an embodiment of the disclosure, the touch panel 300 may be combined with a display panel to form a touch display panel, in which the touch panel 300 may be disposed under the display panel. In an embodiment of the disclosure, the display panel may be, for example, a liquid-crystal display (LCD), a light-emitting diode (LED) display, or an organic light-emitting diode (OLED) display. The display panel may, for example, include a pixel array, and the pixel array may include multiple display pixels configured in an array and multiple sensing pixels for fingerprint sensing. In an embodiment of the disclosure, the driver integrated circuit 100 may include a processing circuit, and the processing circuit may be a touch panel sensor chip (i.e., touch with display driver, TDDI) of the terminal device. The terminal device may be a mobile phone or a tablet with a fingerprint sensing function, but the disclosure is not limited thereto.

In an embodiment of the disclosure, the touch sensing control circuit 110 may be configured to receive a touch event notification from the touch panel 300 and notify the application 210 about the touch coordinates of the touch event. It should be noted that there are multiple interfaces between the touch panel 300, the touch sensing control circuit 110, and the memory 200 configured for direct communication with each other.

Figure 2:
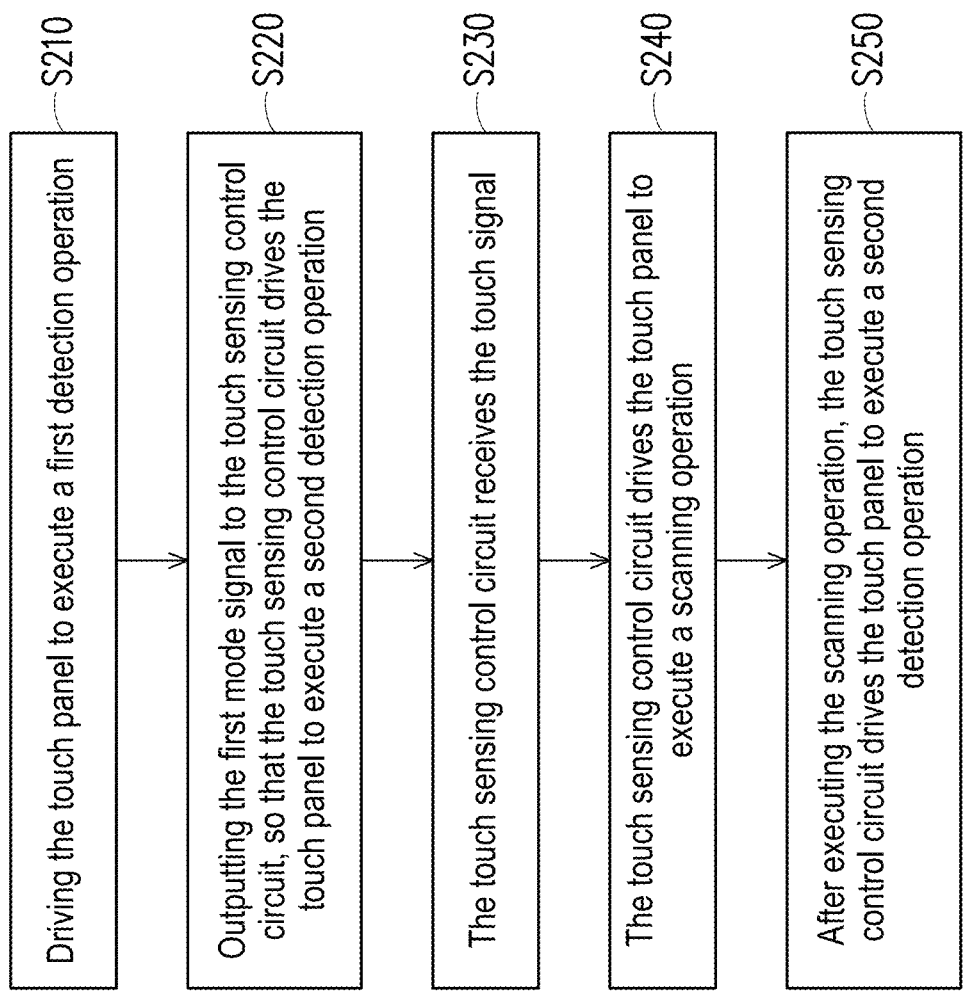
FIG. 2 is a first flowchart of a driving method of an embodiment of the disclosure.

FIG. 2 is a first flowchart of a driving method of an embodiment of the disclosure. Referring to FIG. 1 and FIG. 2, the driver integrated circuit 100 may execute the following step S210 to step S250 to execute a touch detection operation in the touch operation of the terminal device. The driver integrated circuit 100 may establish direct communication to facilitate at least one of the touch sensing operation and the display operation. In an embodiment of the disclosure, when a touch subject (e.g., a finger of the user) is placed on the touch panel 300 to trigger a touch event, the touch sensing control circuit 110 further outputs touch data to the application 210 according to the touch event on the touch panel 300, so that the application 210 generates or acquires the touch coordinates.

In step S210, the touch sensing control circuit 110 is coupled to the processor of the application 210 and configured to drive the touch panel 300 to execute the first detection operation. The first detection operation detects whether a touch event occurs on the touch panel 300. Then, when the touch panel 300 detects a touch event, it sends a touch signal to the touch sensing control circuit 110. The touch event is, for example, the user clicking or operating the touch panel 300 with a finger. In step S230, the touch sensing control circuit 110 receives the touch signal. In step S240, the touch sensing control circuit 110 drives the touch panel 300 to execute a scanning operation. The scanning operation executes two-dimensional touch detection on the touch panel 300, determines the touch coordinates of the touch event on the touch panel 300, and then inputs the touch coordinates to the application 210.

In another embodiment of the disclosure, step S220 may be further included between step S230 and step S210. In step S220, when the touch panel 300 executes the first detection operation, the processor of the application 210 outputs a mode signal to the touch sensing control circuit 110 so that the touch sensing control circuit 110 drives the touch panel 300 to execute the second detection operation. The mode signal may be a game mode signal, a high detection mode signal, or a high sensitivity mode signal. In another embodiment, the application 210 outputs a second mode signal to the touch sensing control circuit 110 so that the touch sensing control circuit 110 drives the touch panel 300 to execute the first detection operation. The second mode signal may be a normal mode signal, an exit game mode signal, or a power saving mode signal.

In step S250, after executing the scanning operation, the touch sensing control circuit 110 drives the touch panel 300 to execute the second detection operation. A sampling frequency of the second detection operation is higher than a sampling frequency of the first detection operation. The sampling frequency of the second detection operation is 2 times to 7 times the sampling frequency of the first detection operation. For example, the sampling frequency of the second detection operation is 1000 Hz to 1200 Hz, and the sampling frequency of the first detection operation is 220 Hz to 240 Hz. Therefore, by detecting the touch event or receiving the first mode signal, the touch panel 300 is driven to execute the second detection operation, so that the touch panel 300 detects the touch event with a high sampling frequency. Therefore, the driver integrated circuit 100 may quickly detect touch events to improve the smoothness of operating the touch panel 300 and reduce delay. In addition, more detailed implementation of the driver integrated circuit 100 is described in the following embodiments.

Figure 3:
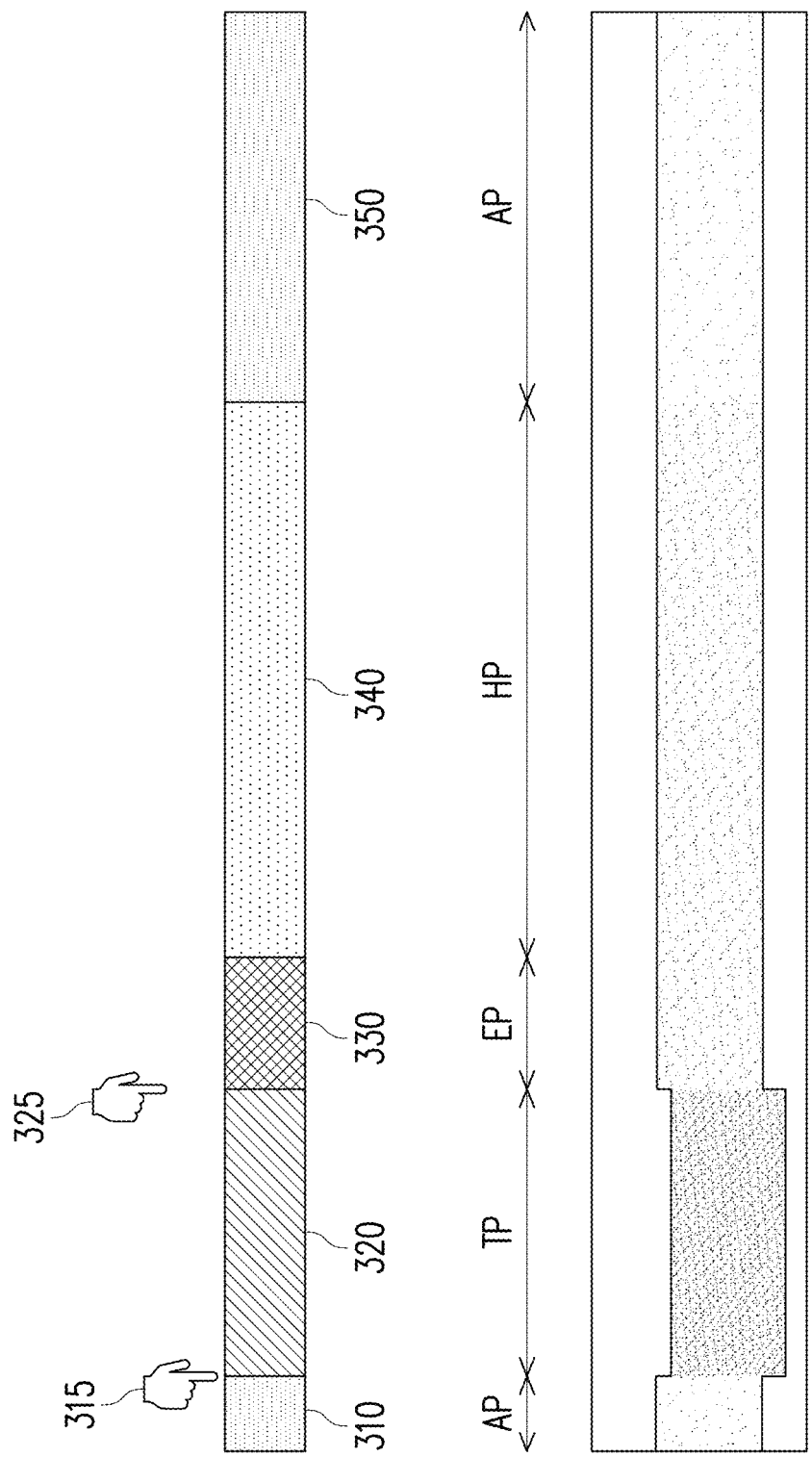
FIG. 3 is a first operation timing diagram and a voltage signal diagram of an embodiment of the disclosure.
Figure 4:
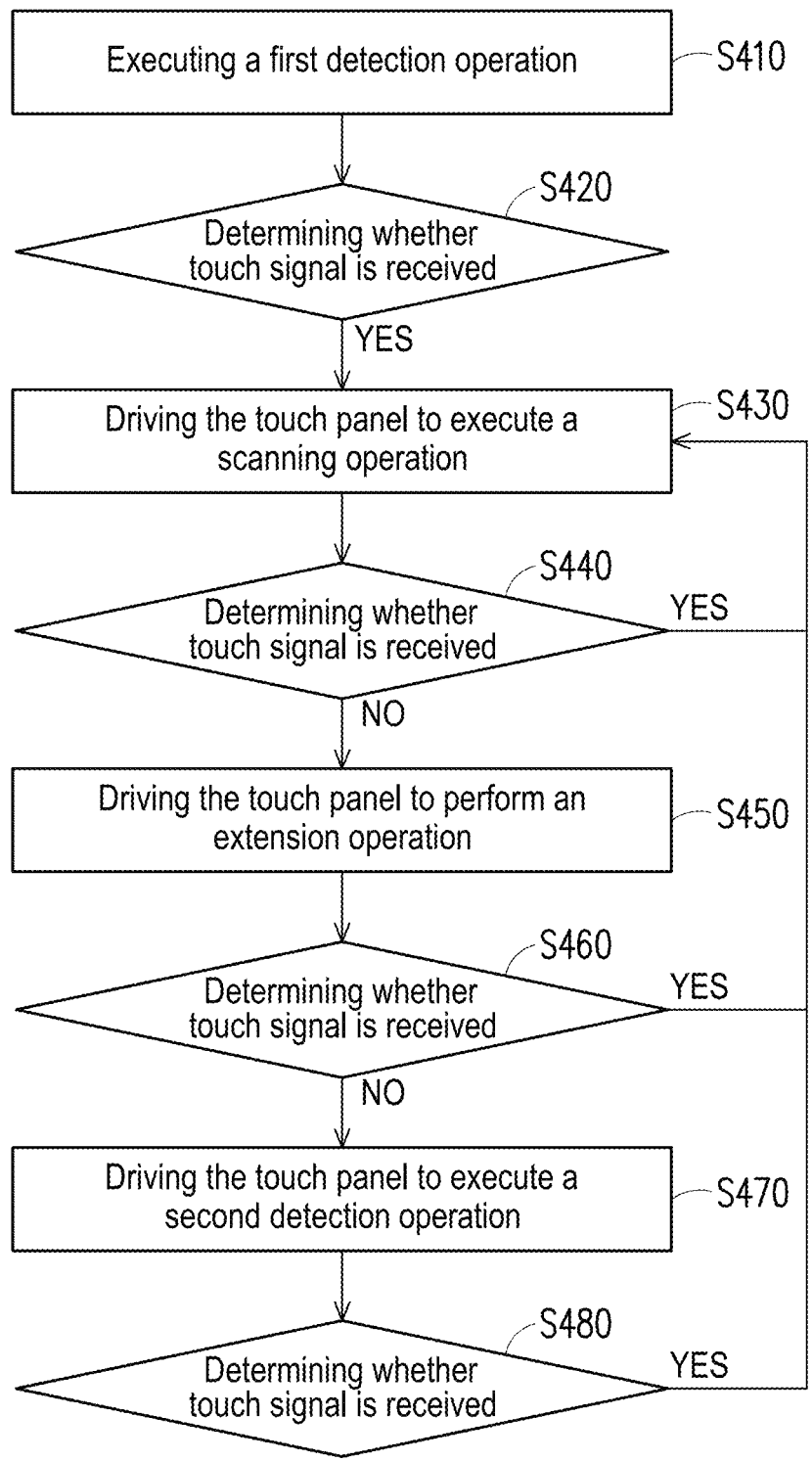
FIG. 4 is a second flowchart of a driving method of an embodiment of the disclosure.

FIG. 3 is a first operation timing diagram and a voltage signal diagram of an embodiment of the disclosure. FIG. 4 is a second flowchart of a driving method of an embodiment of the disclosure. Referring to FIG. 1, FIG. 3, and FIG. 4, the touch panel 300 and the driver integrated circuit 100 of FIG. 1 are adapted for executing steps S410 to S480 to execute the detection operation of the touch panel 300. As shown in FIG. 3 and FIG. 4, in step S410, the touch sensing control circuit 110 drives the touch panel 300 to execute the first detection operation 310. In step S420, during the period when the touch panel 300 executes the first detection operation 310, the touch sensing control circuit 110 determines whether a touch signal is received.

When the touch panel 300 detects the touch event 315, the touch panel 300 sends a touch signal to the touch sensing control circuit 110, so that the touch sensing control circuit 110 receives the touch signal and executes step S430. In step S430, in response to receiving the touch signal, the touch sensing control circuit 110 drives the touch panel 300 to execute the scanning operation 320. The duration of the scanning operation 320 executed by the touch panel 300 depends on the duration of the touch event 315. In step S440, the touch sensing control circuit 110 determines whether a touch signal is received. In other words, when the user continues to press the touch panel 300, the touch panel 300 continues to execute the scanning operation 320. In step S440, in response to the touch sensing control circuit 110 not receiving a touch signal, the touch sensing control circuit 110 then executes step S450. As shown in FIG. 3, the touch sensing control circuit 110 determines that the touch signal is not received, and then acquires the touch stop event 325.

In step S450, the touch sensing control circuit 110 drives the touch panel 300 to execute the extension operation 330. In an embodiment of the disclosure, the extended sensing period of the extension operation 330 may be between 1 second and 5 seconds. In one embodiment, the extended sensing period of the extension operation 330 is 2 seconds. The extension operation 330 is for the touch sensing control circuit 110 to drive the touch panel 300 to continuously execute two-dimensional scanning to detect touch events and output the touch coordinate signals to the application 210 in real time. In step S460, during the period when the touch panel 300 executes the extension operation 330, the touch sensing control circuit 110 determines whether a touch signal is received. In step S460, when a touch event is detected during the extension operation 330 of the touch panel 300, the touch sensing control circuit 110 drives the touch panel 300 to repeat step S430.

In step S460, when the touch panel 300 does not detect a touch event during the extension operation 330, step S470 is then executed. In step S470, the touch sensing control circuit 110 drives the touch panel 300 to execute the second detection operation 340. In step S480, when the touch panel 300 executes the second detection operation 340, the touch sensing control circuit 110 determines whether a touch signal is received. In response to the touch sensing control circuit 110 receiving the touch signal in step S480, the touch sensing control circuit 110 repeatedly executes step S430. The second detection operation is for the touch sensing control circuit 110 to drive the touch panel 300 to execute one-dimensional scanning during a high-frequency sampling period. In an embodiment of the disclosure, the detection period of the second detection operation 340 is 2 times to 6 times of the extended sensing period EP of the extension operation 330. The detection period of the second detection operation 340 may be 2 to 15 seconds. For example, the detection period (i.e., the high-frequency sampling period) of the second detection operation 340 is 8 seconds.

In response to the touch sensing control circuit 110 not receiving the touch signal in step S480, the touch sensing control circuit 110 drives the touch panel 300 to execute the first detection operation 350. The first detection operation (310, 350) and the second detection operation 340 are for the touch sensing control circuit 110 to drive the touch panel 300 to only execute detection in the X-axis direction or only in the Y-axis direction, to detect whether there is a touch event. As shown in the voltage signal diagram of FIG. 3, the first detection operation 310 has an operation period AP, the scanning operation 320 has a scan period TP, the extension operation 330 has an extended sensing period EP, the second detection operation 340 has a detection period HP, and the first detection operation 350 has a detection period AP.

Figure 5:
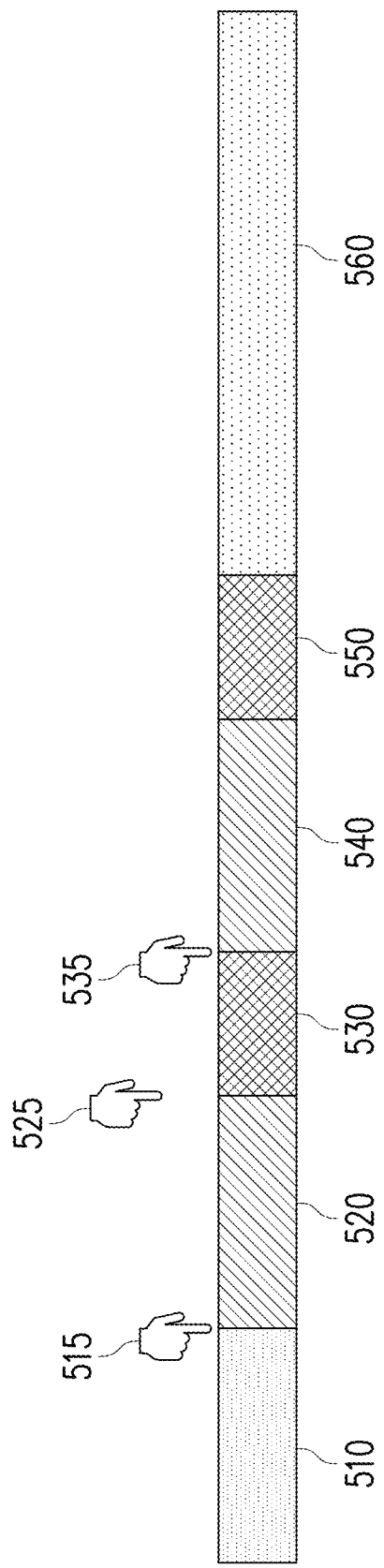
FIG. 5 is a second operation timing diagram of an embodiment of the disclosure.

FIG. 5 is a second operation timing diagram of an embodiment of the disclosure. Refer to FIG. 1, FIG. 4, and FIG. 5, as shown in FIG. 5, when the touch event 515 is detected during the first detection operation 510 of the touch panel 300, the touch sensing control circuit 110 drives the touch panel 300 to execute the scanning operation 520. In another embodiment of the disclosure, the touch sensing control circuit 110 may receive the first mode signal from the application 210, and then drive the touch panel 300 to execute the second detection operation. When the touch panel 300 executes the second detection operation, after the touch sensing control circuit 110 receives the touch signal, the touch sensing control circuit 110 similarly drives the touch panel 300 to execute the scanning operation 520.

When the touch sensing control circuit 110 detects the end of the touch event 515 (i.e., the touch stop event 525) through the touch panel 300, the extension operation 530 is then executed. In another embodiment of the disclosure, during the period when the touch panel 300 executes the extension operation 530, the touch sensing control circuit 110 detects another touch event 535, and then drives the touch panel 300 to execute the scanning operation 540.

As shown in FIG. 1, FIG. 4, and FIG. 5, during the period when the touch panel 300 executes the scanning operation 540, the touch sensing control circuit 110 detects the end of the touch event 535, and then drives the touch panel 300 to execute the extension operation 550. During the period when the touch panel 300 executes the extension operation 550 and the touch sensing control circuit 110 does not receive a touch signal, the touch sensing control circuit 110 drives the touch panel 300 to execute the second detection operation 560.

Figure 6:
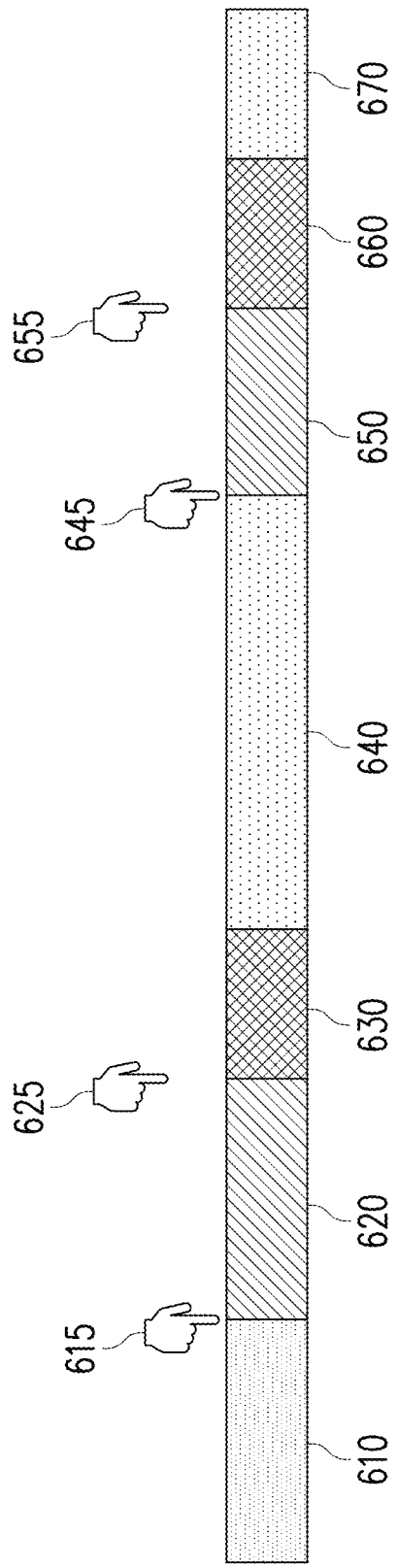
FIG. 6 is a third operation timing diagram of an embodiment of the disclosure.

FIG. 6 is a third operation timing diagram of an embodiment of the disclosure. Refer to FIG. 1, FIG. 4 and FIG. 6, as shown in FIG. 6, the touch sensing control circuit 110 drives the touch panel 300 to execute the first detection operation 610. Furthermore, the touch sensing control circuit 110 detects the touch event 615, and then drives the touch panel 300 to execute the scanning operation 620 until the touch stop event 625 is detected. As shown in FIG. 6, the touch sensing control circuit 110 detects the touch stop event 625 and then drives the touch panel 300 to execute the extension operation 630. After the touch panel 300 executes the extension operation 630 to continuously extend the sensing period, the touch sensing control circuit 110 drives the touch panel 300 to execute a second detection operation 640 to detect the touch event through a high-frequency sampling mode.

In the embodiment shown in FIG. 6, the touch sensing control circuit 110 detects the touch event 645 during the period when the touch panel 300 executes the second detection operation 640, and then executes the scanning operation 650 again. Furthermore, the touch sensing control circuit 110 then executes the extension operation 660 and the second detection operation 670 after the touch event 645 stops (i.e., the touch stop event 655).

Figure 7:
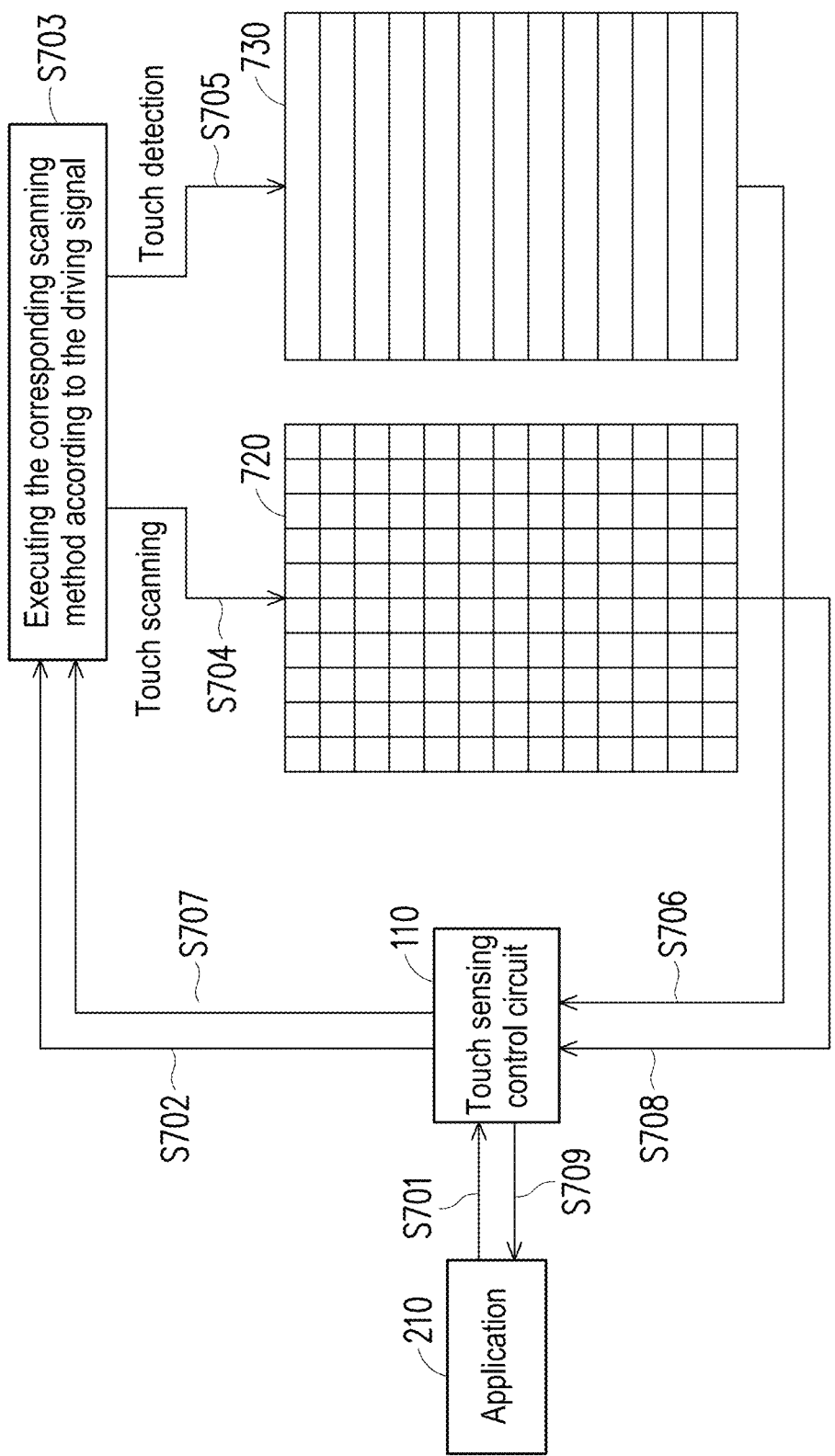
FIG. 7 is a schematic diagram of a touch sensing control circuit, an application, and a touch panel of an embodiment of the disclosure.

FIG. 7 is a schematic diagram of a touch sensing control circuit, an application, and a touch panel of an embodiment of the disclosure. As shown in FIG. 1, FIG. 2, and FIG. 7, the driver integrated circuit 100 may execute the following step S701 to step S709 to execute different touch detection operations on the touch panel 300. As shown in FIG. 7, the touch panel 300 may only execute one-dimensional touch detection in the X-axis direction or only in the Y-axis direction through the sensing array, or may execute two-dimensional touch detection in the X-axis direction and Y-axis direction through the sensing array. The two-dimensional touch detection is two-dimensional touch scanning. When the mode signal and touch event are not received, the touch panel 300 executes the first detection operation. In step S701, the application 210 outputs a first mode signal to the touch sensing control circuit 110. In step S702, the touch sensing control circuit 110 transmits a driving signal to the touch panel 300 based on the first mode signal.

In step S703, the touch panel 300 executes a corresponding scanning method according to the touch signal. The scanning method includes touch detection and touch scanning. The touch scanning executes two-dimensional scanning through the X-axis and Y-axis sensing arrays. In step S704, during the process when the touch panel 300 executes two-dimensional scanning, the touch panel 300 outputs the touch coordinate parameters of the touch event to the touch sensing control circuit 110 (i.e., step S708). In step S709, the touch sensing control circuit 110 outputs the touch coordinate parameters to the application 210.

The touch detection scanning is a one-dimensional scan executed only through the sensing array in the X-axis direction or only through the sensing array in the Y-axis direction. In step S705, during the process when the touch panel 300 executes the touch detection scanning, the touch panel 300 outputs the touch signal to the touch sensing control circuit 110 (i.e., step S706).

After the touch sensing control circuit 110 receives the touch signal, the touch sensing control circuit 110 then executes step S707. In step S707, the touch sensing control circuit 110 outputs a scan driving signal to the touch panel 300 to drive the touch panel 300 to execute a scanning operation (i.e., touch scanning). In addition, the driver integrated circuit 100 may be integrated into the electronic device and electrically connected to the processor and memory of the electronic device. The electronic device may be a smart phone, a tablet, a computer, and other devices. The processor may execute a client application (CA) or other applications 210, and the disclosure is not limited thereto.

Therefore, in an embodiment of the disclosure, the driver integrated circuit 100 and the electronic device may effectively reduce the delay of touch detection by executing the above steps S701 to step S709, and detect touch events through high-frequency sampling so that the driver integrated circuit 100 may drive the touch panel to sensitively detect the touch events of the user. In other words, compared to conventional detection operations, the touch panel 300 driven by the driver integrated circuit 100 continues to detect touch events with high-frequency sampling for a period of time (i.e., the extended sensing period of the extension operation and the execution period of the second detection operation) after user touch has stopped, effectively reducing touch delay.

In summary, the driver integrated circuit for touch sensing and the driving method thereof of the disclosure may use the extension operation and the driving signal of the second detection operation, so that the touch panel switches the scanning method according to the driving signal, thereby reducing the delay time of touch detection and improving user satisfaction.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:

1. A driver integrated circuit for touch sensing, adapted for driving a touch panel with a touch sensor, wherein the driver integrated circuit comprises:
   a touch sensing control circuit, coupled to an application processor, and configured to drive the touch panel to execute a first detection operation,
   wherein the touch sensing control circuit receives a touch signal, the touch sensing control circuit drives the touch panel to execute a scanning operation,
   wherein after executing the scanning operation, the touch sensing control circuit drives the touch panel to execute a second detection operation, wherein a sampling frequency of the second detection operation is higher than a sampling frequency of the first detection operation.

2. The driver integrated circuit for touch sensing according to claim 1, wherein when the touch panel executes the second detection operation, the touch sensing control circuit determines whether the touch signal is received, in response to the touch sensing control circuit receiving the touch signal, the touch sensing control circuit drives the touch panel to execute the scanning operation, in response to the touch sensing control circuit determining that the touch signal is not received, the touch sensing control circuit drives the touch panel to execute the first detection operation.

3. The driver integrated circuit for touch sensing according to claim 1, wherein when the touch panel executes the first detection operation, the touch sensing control circuit determines whether the touch signal is received, in response to the touch sensing control circuit receiving the touch signal, the touch sensing control circuit drives the touch panel to execute the scanning operation.

4. The driver integrated circuit for touch sensing according to claim 1, wherein after the touch sensing control circuit drives the touch panel to execute the scanning operation, the touch sensing control circuit drives the touch panel to execute an extension operation, wherein the extension operation is for the touch panel to executing two-dimensional scanning during an extended sensing period.

5. The driver integrated circuit for touch sensing according to claim 4, wherein when the touch panel executes the first detection operation, the application processor outputs a mode signal to the touch sensing control circuit, so that the touch sensing control circuit drives the touch panel to execute the second detection operation, wherein the sampling frequency of the second detection operation is 2 times to 7 times the sampling frequency of the first detection operation, wherein a detection period of the second detection operation is 2 times to 6 times the extended sensing period.

6. The driver integrated circuit for touch sensing according to claim 4, wherein the scanning operation is for the touch sensing control circuit to drive the touch panel to execute the two-dimensional scanning to generate a touch coordinate signal, wherein the touch sensing control circuit receives the touch coordinate signal, and then outputs the touch coordinate signal to the application processor.

7. The driver integrated circuit for touch sensing according to claim 4, wherein the touch panel executes one of the scanning operation and the extension operation, and when the touch sensing control circuit receives the touch signal, the touch sensing control circuit drives the touch panel to execute the scanning operation.

8. The driver integrated circuit for touch sensing according to claim 1, wherein the first detection operation is for the touch sensing control circuit to drive the touch panel to execute one-dimensional scanning.

9. The driver integrated circuit for touch sensing according to claim 8, wherein the second detection operation is for the touch sensing control circuit to drive the touch panel to execute the one-dimensional scanning during a high-frequency sampling period.

10. The driver integrated circuit for touch sensing according to claim 9, wherein when the touch sensing control circuit drives the touch panel to execute the one-dimensional scanning, the touch panel generates the touch signal in response to a touch event on the touch panel, and then outputs the touch signal to the touch sensing control circuit.

11. A driving method, adapted for a driver integrated circuit for touch sensing, wherein the driver integrated circuit is adapted for driving a touch panel with a touch sensor, wherein the driving method comprises:

driving the touch panel through a touch sensing control circuit to execute a first detection operation;

receiving a touch signal through the touch sensing control circuit, and driving the touch panel to execute a scanning operation through the touch sensing control circuit;

driving the touch panel through the touch sensing control circuit to execute a second detection operation after executing the scanning operation, wherein a sampling frequency of the second detection operation is higher than a sampling frequency of the first detection operation.

12. The driving method according to claim 11, wherein executing the second detection operation through the touch panel comprises:

determining whether the touch signal is received through the touch sensing control circuit;

in response to the touch sensing control circuit receiving the touch signal, driving the touch panel to execute the scanning operation through the touch sensing control circuit;

in response to the touch sensing control circuit determining that the touch signal is not received, driving the touch panel to execute the first detection operation through the touch sensing control circuit.

13. The driving method according to claim 11, wherein the touch panel executing the first detection operation comprises:

determining whether the touch signal is received through the touch sensing control circuit;

in response to the touch sensing control circuit receiving the touch signal, driving the touch panel to executing the scanning operation through the touch sensing control circuit.

14. The driving method according to claim 11, wherein after driving the touch panel to execute the scanning operation through the touch sensing control circuit, the method comprises:

driving the touch panel to execute an extension operation through the touch sensing control circuit, wherein the extension operation is for the touch panel to executing two-dimensional scanning during an extended sensing period.

15. The driving method according to claim 14, further comprising:

outputting a mode signal to the touch sensing control circuit through the application processor when executing the first detection operation through the touch panel;

driving the touch panel through the touch sensing control circuit to execute the second detection operation, wherein the sampling frequency of the second detection operation is 2 times to 7 times the sampling frequency of the first detection operation, wherein a detection period of the second detection operation is 2 times to 6 times the extended sensing period.

16. The driving method according to claim 14, wherein the scanning operation is driving the touch panel to execute the two-dimensional scanning through the touch sensing control circuit to generate a touch coordinate signal;

receiving the touch coordinate signal through the touch sensing control circuit, and then outputting the touch coordinate signal to the application processor.

17. The driving method according to claim 14, wherein one of the scanning operation and the extension operation is executed through the touch panel, and when the touch signal is received through the touch sensing control circuit, the touch panel is driven through the touch sensing control circuit to execute the scanning operation.

18. The driving method according to claim 11, wherein the first detection operation is to drive the touch panel to execute one-dimensional scanning through the touch sensing control circuit.

19. The driving method according to claim 18, wherein the second detection operation is for the touch sensing control circuit to drive the touch panel to execute the one-dimensional scanning during a high-frequency sampling period.

20. The driving method according to claim 19, wherein driving the touch panel to execute the one-dimensional scanning through the touch sensing control circuit comprises:
    generating the touch signal through the touch panel in response to a touch event on the touch panel, and then outputting the touch signal to the touch sensing control circuit.

\* \* \* \* \*